United States Patent
Uchida et al.

(10) Patent No.: US 6,375,793 B1
(45) Date of Patent: Apr. 23, 2002

(54) METHOD AND TOWER FOR REMOVING RESIDUAL MONOMERS

(75) Inventors: Seiichi Uchida, Chiba; Toshinobu Kurazono, Minamata; Seigo Ishibashi, Ichihara; Etsuro Matsuda, Minamata, all of (JP)

(73) Assignee: Swarovski Optik KG, Absam (AT)

( * ) Notice: Subject to any disclaimer, the term of this patent is extended or adjusted under 35 U.S.C. 154(b) by 0 days.

(21) Appl. No.: 08/385,110

(22) Filed: Feb. 7, 1995

(30) Foreign Application Priority Data

Feb. 7, 1994 (JP) .............................. 6-034149

(51) Int. Cl.[7] .............................. B01D 3/38
(52) U.S. Cl. .............. 159/16.3; 159/4.4; 159/DIG. 10; 202/158; 202/234
(58) Field of Search ................ 202/234, 158; 203/96, 97, 92, 49; 196/111; 159/47.1, 16.3, 4.4, DIG. 10, 404; 528/501, 500

(56) References Cited

U.S. PATENT DOCUMENTS

| 1,919,599 | A | * | 7/1933 | Schonberg | ............ 202/158 |
| 2,433,060 | A | * | 12/1947 | Ohsol et al. | ................ 203/20 |
| 2,845,444 | A | * | 7/1958 | Thomson | ................... 202/158 |
| 3,249,516 | A | * | 5/1966 | Mueller | ..................... 202/158 |
| 3,607,041 | A | * | 9/1971 | Ellis et al. | .................. 202/158 |
| 3,844,898 | A | * | 10/1974 | De Graff | ..................... 202/158 |
| 3,959,085 | A | * | 5/1976 | De Graff | ..................... 202/158 |
| 3,975,164 | A | * | 8/1976 | Brown | ......................... 202/158 |
| 4,017,355 | A | * | 4/1977 | Kiyota et al. | ........ 159/DIG. 10 |
| 4,086,414 | A | * | 4/1978 | Hornbaker et al. | ........... 203/96 |
| 4,158,092 | A | * | 6/1979 | Botsch et al. | ................ 528/500 |
| 4,282,348 | A | * | 8/1981 | Wada et al. | ................. 528/500 |
| 4,297,483 | A | | 10/1981 | Mejdell et al. | |
| 4,303,479 | A | * | 12/1981 | Church et al. | ................. 203/92 |
| 4,483,747 | A | * | 11/1984 | Aruga et al. | ................. 202/158 |

FOREIGN PATENT DOCUMENTS

| FR | 2462448 | | 2/1981 | |
| GB | 2030153 | | 4/1980 | |
| JP | 6-107723 | | 4/1994 | |
| SU | 1348188 | * | 10/1987 | ................... 203/96 |

OTHER PUBLICATIONS

"Polymer Devolatilization: State of the Art"; Die Makromolekulare Chemie: Macromolecular Symposia; pp. 1–12; ®Apr., 1993.

* cited by examiner

*Primary Examiner*—Virginia Manoharan
(74) *Attorney, Agent, or Firm*—Fay, Sharpe, Fagan, Minnich & McKee, LLP

(57) ABSTRACT

The present invention provides a method and a tower for removing residual monomers in the manufacture of vinyl chloride resins (PVC). When residual monomers are removed from a PVC slurry after the slurry has undergone a polymerization due to contact with steam, the bubbles generated in the slurry are controlled to maintain stable fluid conditions. Residual monomers are effectively removed, and inclusion of foreign matter is inhibited. The tower has two or more levels and is divided into upper and lower sections. The inner diameter of the upper section is greater than that of the lower section. Each section is provided with at least one perforated tray. In addition, at least one hot water-ejecting device is provided in the tower.

5 Claims, 3 Drawing Sheets

→ : DIRECTION OF THE FLOW OF PVC SLURRY

METHOD AND TOWER FOR REMOVING RESIDUAL MONOMERS

BACKGROUND OF THE INVENTION

1. Field of the Invention

The present invention relates to a method for removing residual monomers in the manufacture of vinyl chloride resins (hereinafter collectively referred to as PVC). While preventing inclusion of foreign matter (coloring of PVC particles), the invention effectively removes unreacted residual monomers mainly composed of vinyl chloride monomers (hereinafter referred to as VC) which remain in PVC particles and in an aqueous medium when PVC is manufactured.

More particularly, the present invention relates to a method in which residual monomers contained in a PVC slurry (a dispersion mixture of PVC particles, an aqueous medium, and residual monomers) after termination of a polymerization reaction are removed by treatment with steam while generation of bubbles from the PVC slurry is controlled so that the slurry maintains a stable fluid state constantly, thereby achieving effective residual monomer removal, and in which at the same time, foreign matter is prevented from being included in the end product PVC.

The invention also relates to a tower for removing residual monomers.

2. Description of Related Art

PVC has excellent chemical and physical characteristics, and therefore, is used in many fields. Generally, PVC is manufactured by suspension polymerization, emulsion polymerization, block polymerization, or similar methods. Among these methods, suspension polymerization and emulsion polymerization are commonly employed since they provide advantages such that heat of reaction can be easily removed, that the final product of PVC will contain a reduced amount of contaminants, and that PVC after polymerization is particulate, eliminating a granulating stage.

Suspension polymerization and emulsion polymerization are generally carried out by placing VC, an aqueous medium, a dispersant, a polymerization initiator, etc. in a reactor equipped with a stirrer, and stirring the resulting mixture while a predetermined temperature is maintained. It is a general practice that the polymerization reaction is terminated when the conversion factor has reached a range from 80 to 95% which provides an optimum manufacturing efficiency, rather than the reaction being continued until the VC has been converted to PVC by 100%. Therefore, the PVC slurry after undergoing a polymerization reaction contains a considerable amount of unreacted residual monomers.

Since these residual monomers are harmful to humans, care must be taken to avoid cases where they contaminate PVC particles, or where they migrate into water or the air. In other words, residual monomers must be removed and recovered from the PVC slurry as much as possible.

According to ordinary PVC manufacturing methods, an aqueous medium is mechanically separated from the PVC slurry after polymerization, and the aqueous medium and residual monomers which remain in PVC in small amounts are removed by hot air-drying, etc. to obtain powder PVC, which is the end product.

This procedure cannot avoid cases where the gas exhausted from a dryer contains residual monomers, or the obtained powder PVC was contaminated with a small amount of residual monomers. Thus, conventional manufacturing methods involve the risk of jeopardizing the environment.

Japanese Patent Application Laid-open (kokai) Nos. 54-8693 and 56-22305 propose an improved method which uses a tower housing a plurality of perforated trays and having a bottom port for jetting steam into the tower for more effectively removing and recovering unreacted residual monomers from a PVC slurry.

The characteristic feature of this method resides in the perforated trays, each having a perforated bottom plate carrying partition walls thereon to provide zig-zag passages for the treatment of PVC slurry. When the PVC slurry passes the passages formed on the perforated trays, it is exposed to steam jetted from the bottom of the tower through perforation, by which the residual monomers contained in the PVC slurry are evaporated and separated. This type of method for removing residual monomers is called a demonomerizing method, which has become a mainstream of residual monomer removing techniques.

The demonomerizing method, however, has the following drawback. If the flow rate of the PVC slurry running through the passages on the perforated trays is high, the PVC slurry is excessively bubbled by residual monomers evaporated as a result of contact with steam. The excessive bubbling further causes the following drawbacks.

1. PVC slurry flows over the partition walls and is discharged without passing through the passages for treatment (contact with steam), resulting in an admixture with a PVC slurry from which residual monomers have not been sufficiently removed.

2. PVC particles enter the condenser together with the bubbles formed.

3. PVC particles adhere onto the inner walls of the treatment apparatus (tower), and the adhered particles deteriorate after being exposed to steam at a high temperature, eventually making themselves a foreign matter.

Particularly, improved PVC particles having increased porosity, which have been designed to enhance the capability of absorbing plasticizers, contain a large amount of residual monomers within the PVC particles after polymerization. If it is attempted to treat such a PVC slurry by the above-mentioned demonomerizing method, bubbling takes places excessively, and the above itemized shortcomings are even more significant.

The above-described problems may not be encountered if the flow rate of the PVC slurry is reduced, but a reduction in flow rate results in a considerable drop in the treatment efficiency.

In view of the foregoing, the inventors of the present invention carried out extensive studies, and as a result, the following facts were revealed. First, the bubbles generated when a PVC slurry is contacted with steam on perforated trays are in fact bubbles due to boiling of the residual monomers liberated from the inside of PVC particles and the aqueous medium used. Second, the bubbles elevate the apparent volume of the PVC slurry which flows down the perforated trays. Excessive bubbling thus allows the PVC slurry to overflow beyond the partition walls segmenting the passages for treatment. Third, the contact with steam for 5-minutes results in a 70% removal on the weight basis of the residual monomers existing inside the PVC particles, by which it is presumed that the bubbling phenomenon takes place most vigorously in the uppermost plate of the tower for removing residual monomers.

Based on the above findings, the present inventors have devised a specific shape of a tower having perforated trays for removing residual monomers. That is, the inventors have devised a tower having different inner diameters such that the inner diameter of the upper section of the tower is greater than that of the lower section of the tower, the tower having at least two perforated trays therein with at least one plate at the upper section and at least one plate at the lower section of the tower. In addition, at least one hot water ejection device is provided in the tower. When a tower so constructed was used, unreacted residual monomers were effectively separated and recovered from a PVC slurry, and the thus treated slurry contained an extremely reduced amount of foreign matter.

SUMMARY OF THE INVENTION

Accordingly, an object of the present invention is to overcome the aforementioned drawbacks involved in the conventional demonomerizing method. This object is achieved by an improved method in which residual monomers contained in a PVC slurry after termination of a polymerization reaction are removed by contacting them with steam while generation of bubbles from the PVC slurry is carefully controlled to keep a stable fluid state of the PVC slurry, and as a result, foreign matter is prevented from being included in the end product PVC. The invention also provides a tower which is used in this method.

More precisely, according to a first aspect of the invention, there is provided a method for effectively removing residual monomers comprising a stage of charging a slurry of a vinyl chloride resin which has undergone a polymerization reaction into a tower for removing residual monomers which comprises the following structural features:

1) the tower has a cylindrical shape with two or more different inner diameters,
2) the inner diameter of the upper section of the tower is greater than that of the lower section of the tower,
3) at least one perforated tray is provided at the upper section of the tower,
4) at least one perforated tray is provided at the lower section of the tower,
5) a flow-down section for flowing down the slurry to the lower perforated tray is provided between the perforated trays,
6) a means for ejecting steam in an upward direction in the tower is provided at the bottom of the tower, and
7) at least one hot water-ejecting device is provided toward the perforated tray in the tower.

Preferably, the method is carried out by using a tower in which the inner diameter of the upper section of the tower is from 1.20 to 5 times that of the lower section of the tower.

According to a second aspect of the invention, there is provided a tower for removing residual monomers which comprises the following structural features:

1) the tower has a generally cylindrical or an inverted circular cone shape with two or more different inner diameters,
2) the inner diameter of the upper section of the tower is greater than that of the lower section of the tower,
3) at least one perforated tray is provided at the upper section of the tower,
4) at least one perforated tray is provided at the lower section of the tower,
5) a flow-down section for flowing down the slurry to the lower perforated tray is provided between the perforated trays,
6) a means for ejecting steam in an upward direction in the tower is provided at the bottom of the tower, and
7) at least one hot water-ejecting device is provided toward the perforated tray in the tower.

Preferably, the inner diameter of the upper section of the tower is from 1.20 to 5 times that of the lower section of the tower.

The above and other objects, features and advantages of the present invention will become apparent from the following description.

DESCRIPTION OF PREFERRED EMBODIMENTS

In this invention, the term PVC is used to refer to homopolymers of VC, copolymers of VC and a monomer which is polymerizable with VC, polymers obtained by a graft polymerization of VC into olefin polymers, and polymers which are formed by two or more of these. In order to effectively remove residual monomers by the method of the present invention, the present method is preferably applied to those polymers containing 50% by weight or more of VC as a structural unit of the polymer.

In order to obtain such polymers, either suspension polymerization or emulsion polymerization can be employed.

Specific examples of the polymerizable monomers which can be reacted with VC for polymerization include carboxylic esters of a vinyl alcohol, such as vinyl acetate; vinyl ethers such as alkylvinyl ethers; unsaturated carboxylic esters such as acrylates and methacrylates; vinylidene halides such as vinylidene chloride and vinylidene fluoride, unsaturated nitriles such as acrylonitrile; and olefins such as ethylene and propylene.

In the present invention, the term PVC slurry is used to refer to a liquid dispersion containing a PVC which has undergone a polymerization reaction, unreacted residual monomers, and an aqueous medium primarily containing water. When polymerization is carried out, dispersants such as polyvinyl alcohol or hydroxypropylmethylcellulose are added to the reactor in addition to a buffer, grain size regulators, scaling inhibitors, defoaming agents, etc. as needed. Accordingly, a PVC slurry contains small amounts of these ingredients.

It is preferred that the slurry concentration, i.e., the concentration of the PVC dispersed in a PVC slurry which is treated by the method of the present invention, be from 5 to 45% by weight. and more preferably from 10 to 40% by weight. If the slurry concentration exceeds 45% by weight, the fluidity of the PVC slurry in the tower for removing residual monomers is lost. On the other hand, slurry concentrations less than 5% by weight significantly decrease the efficiency of the removal of residual monomers.

Generally, the PVC slurry which is to be treated by the method of the present invention is transferred to a PVC slurry tank after the polymerization reaction has been completed and the inside pressure of the reactor has dropped to a predetermined pressure. However, it is also possible for the PVC slurry to be transferred before the inside pressure of the reactor drops to a predetermined temperature. Moreover, the polymerization reaction may be terminated when the conversion factor has reached an arbitrary point, and the PVC slurry which had been in the course of undergoing polymerization may be transferred to a PVC slurry tank at an arbitrary point.

The PVC slurry which has been transferred to the slurry tank is pumped into the tower of the present invention for removing residual monomers at a predetermined flow rate.

The method for removing residual monomers from a PVC slurry according to the present invention will next be described in detail with reference to FIG. 1 through FIG. 4. However, these figures should not be construed as limiting the invention.

Figure 1:
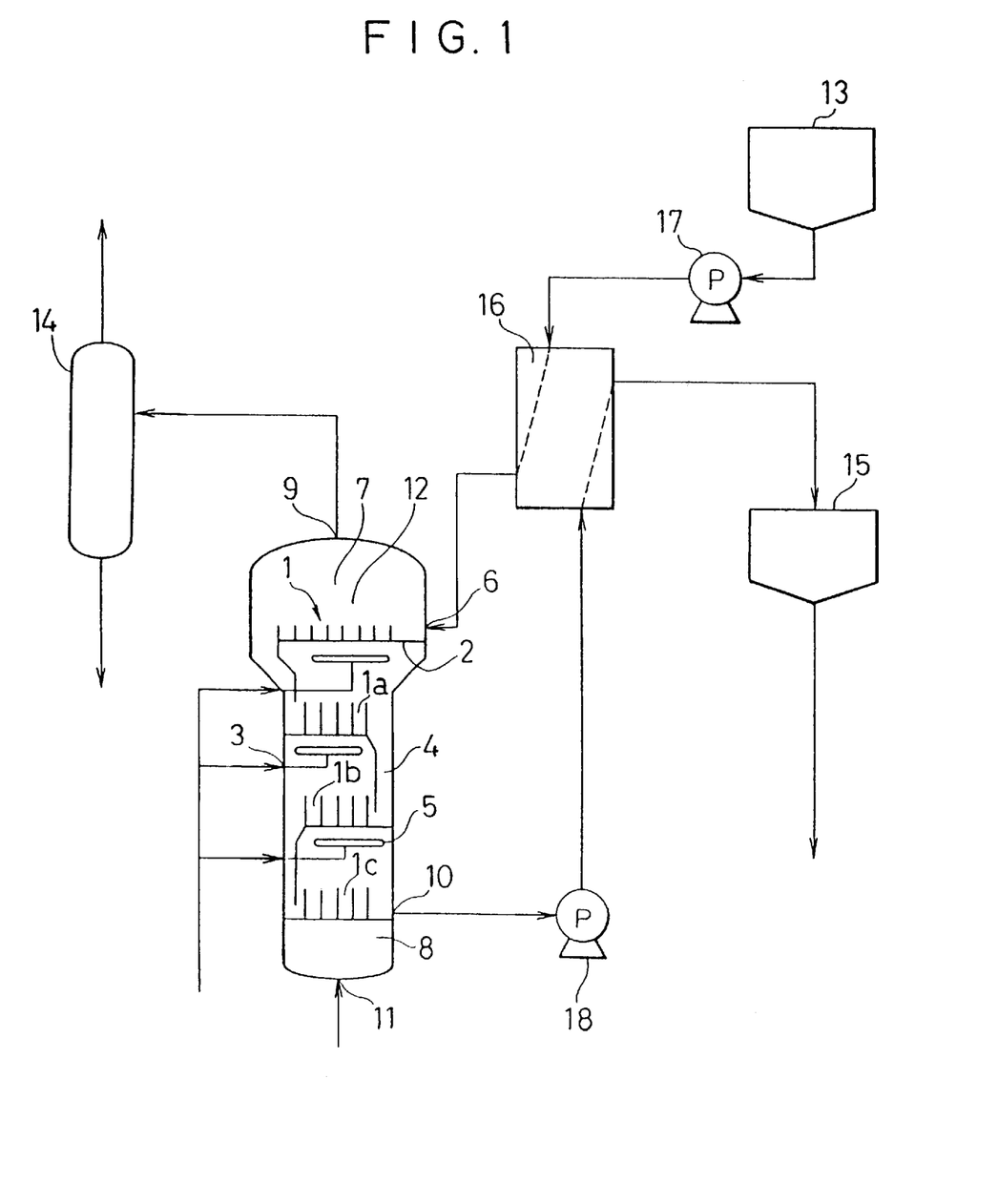
FIG. 1 is a schematic diagram showing the entire system of a demonomerizing apparatus, with a tower for removing residual monomers shown in the center of the diagram.

A PVC slurry prepared by suspension polymerization or emulsion polymerization is temporarily stored in a slurry tank 13. The slurry stored in tank 13 is pumped by a pump 17 and introduced into a heat exchanger 16, where it is heated to a predetermined temperature. Subsequently, the heated slurry is charged into a tower 12 for removing residual monomers therefrom through a PVC slurry introduction port 6 provided at an upper section of the tower 12 onto a perforated tray 1 which is the uppermost plate in the tower 12.

Figure 2:
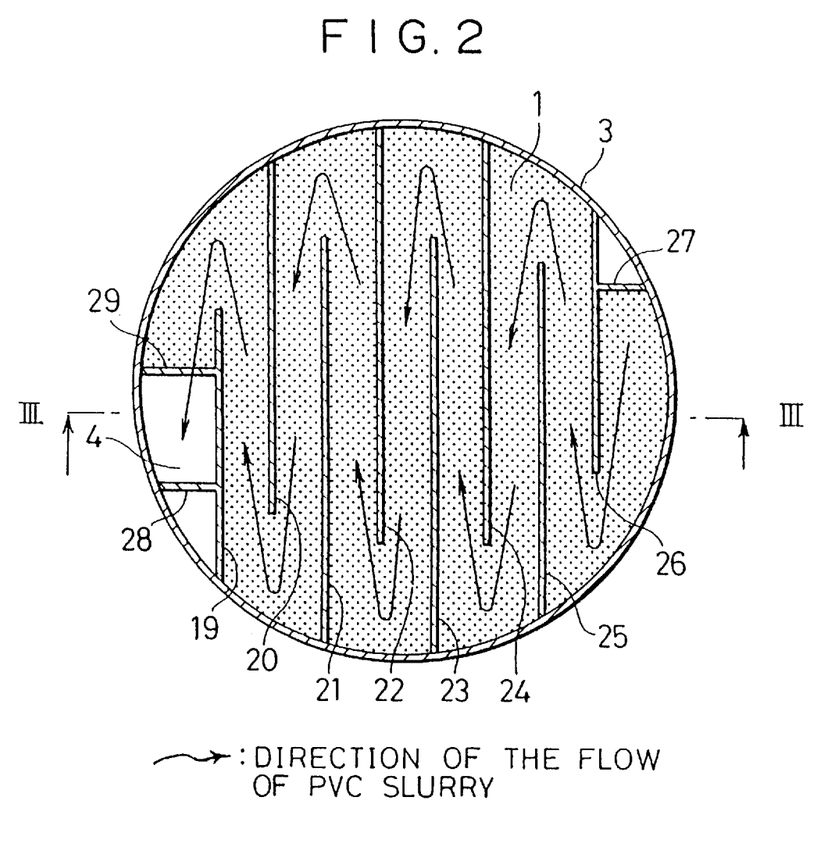
FIG. 2 is a schematic plan view of a perforated tray 1 (uppermost plate).

The flow rate of the PVC slurry flowing into the tower 12 is preferably 0.1 to 300 m$^3$/h, and more preferably from 1 to 100 m$^3$/h, per $^2$ of the perforated baseplate 2 of perforated tray 1 which is the uppermost plate in the tower. The flow rate is controlled to fall within the above ranges by varying the pumping rate of pump 17.

If a PVC slurry is preheated before being charged into tower 12, the efficiency of removing residual monomers enhances. Therefore, it is preferred that the PVC slurry be preheated at 50 to 100° C. by a heat exchanger 16.

The tower 12 for removing residual monomers according to the invention has a cylindrical or an inverted circular cone shape or is a mixture of these shapes. The tower 12 has two or more levels with two or more different inner diameters. The inner diameter of the upper section of the tower is greater than that of the lower section of the tower.

No particular limitation is imposed on the inner diameters of the tower 12. However, it is preferable that the inner diameter of the lower section of the tower 12 be from 200 to 10,000 mm, and that of the upper section of the tower be from 1.20 to 5 times that of the lower section of the tower.

The height of the inside of the tower 12 for removing residual monomers is preferably from 2 to 20 times and more preferably from 5 to 15 times the inner diameter of the lower section of the tower.

In the present invention, when the tower 12 has a stepped cylindrical shape having three or more inner diameters, an inverted circular cone shape, or a cylindrical-circular cone shape, the upper section of the tower and the lower section of the tower are defined as follows based on the average diameter of a plurality of the perforated trays (perforated baseplates) provided in the tower 12. The part in which the inner diameter is greater than the average diameter is defined as the upper section of the tower, and the part in which the inner diameter is smaller than the average diameter is defined as the lower section of the tower. The "inner diameter of the upper section of the tower" refers to the average diameter of the perforated trays (perforated baseplates) provided in the upper section of the tower. Similarly, the "inner diameter of the lower section of the tower" refers to the average diameter of the perforated trays (perforated baseplates) provided in the lower section of the tower.

In the present invention, the inner diameter of the upper section of the tower is made greater than that of the lower section of the tower. As a result, the depth of the PVC slurry passing through the passages for treatment is reduced, resulting in a reduced residence time of steam passing through the PVC slurry. Consequently, bubbling of the PVC slurry is controlled while maintaining the fluidity of the PVC slurry in good conditions. The fluidity is important in that residual monomers can be effectively removed because the demonomerizing treatment can be carried out constantly and continuously. Moreover, flooding of PVC slurry over the partition walls is prevented, eliminating chances of contaminating the end product by the PVC slurry from which residual monomers have not been sufficiently removed.

When PVC slurry passes through the passages on the perforated trays in the lower section of the tower, the depth of the slurry becomes greater, prolonging the time during which the PVC slurry contacts steam. As a result, the residual monomers which were not removed from the slurry at the upper perforated trays can be removed to a great extent.

The concentration of residual monomers in a PVC slurry goes down as the slurry approaches the lowermost perforated trays. Thus, despite the fact that the depth of the PVC slurry becomes greater in the lower section of the tower, bubbling is less significant than in the upper section. Accordingly, even though the tower has a structure in which the lower section has diminished inner diameters that allow the PVC slurry passing through the passages to have a greater depth, the slurry does not flood over the partition walls. Instead, a high percentage of residual monomers in the PVC slurry can be removed. Accordingly, it is advantageous that the diameters of the perforated trays decrease towards the lowermost plates of the tower.

As described above, the tower 12 of the present invention is provided with at least one perforated tray in the upper section of the tower and at least one perforated tray in the lower section of the tower. In FIG. 1, the tower 12 for removing residual monomers is a four-stages tower having a perforated tray 1 in the upper section of the tower and perforated trays 1a to 1c in the lower section of the tower. Although the number of plates is not necessarily 4, the inner diameters of the plates must satisfy the following conditions: $D_1 \geq D_{1a} \leq D_{1b} \leq D_{1c}$ excluding the case where $D_1 = D_{1a} = D_{1b} = D_{1c}$ ($D_1$, $D_{1a}$ $D_{1b}$ and $D_{1c}$ are the inner diameters of the plates 1, 1a, 1b, and 1c). If these conditions are not met, demonomerizing treatment cannot be carried out effectively. The preferable condition is $D_1 > D_{1a} \geq D_{1b} \geq D_{1c}$.

The number of perforated trays is determined taking into account the difficulty of removing residual monomers from a PVC slurry. When the present method is applied to PVC slurries from which residual monomers are very difficult to remove, an increased number of plates is required. The number of perforated trays placed in the upper section of the tower and the number of the plates placed in the lower section of the tower are each defined taking the degree of bubbling of PVC slurry into account. If the PVC slurry to be treated is liable to cause significant bubbling, it is advantageous to increase the number of perforated trays in the upper section of the tower.

Each perforated tray has a perforated baseplate having many small perforations and a plurality of partition walls standing vertically on the upper surface of the baseplate.

The perforations in the baseplates are for allowing steam to be ejected therethrough and to demonomer the PVC slurry passing through the passages provided on the perforated trays.

The time required for removing residual monomers from a PVC slurry is the time required for the PVC slurry to pass through the passages for treatment provided on perforated trays. Accordingly, in order to prolong the time required for passage through the passages, the number of partition walls is advantageously increased to lengthen the passages. The layout of the passages varies depending on the manner of installation of the partition walls. Examples of layouts of the passages include hair-pin curves, spirals, radial arrows stars, etc. as circumstances require, with hair-pin curves being preferred.

There are no specific limitations on the number of partitions and the width of the passages of the perforated trays of the present invention. However, if the number of partition is too great and the width of the passages is too narrow, the depth of the flowing PVC slurry becomes too large and therefore excessive bubbling occurs, allowing flooding of the bubbled slurry over the partition walls. Ag a result, PVC slurries treated for different periods are locally present, which is detrimental to the quality of the resulting product and thus undesirable.

If the time required for a PVC slurry to pass through the passages provided on the perforated trays is long enough, residual monomers can be removed to a great degree from PVC particles present in a PVC slurry. However, too long a time causes coloring and thermal deterioration of PVC. Therefore, it is preferred that the passages for treatment be designed so that the time during which the PVC slurry stays in the tower 12 for removing residual monomers is from 1 to 60 minutes, preferably from 2 to 45 minutes, and more preferably from 5 to 30 minutes.

The tower 12 for removing residual monomers according to the present invention has a steam introducing port 11 at the bottom of the tower. The steam ejected from port 11 contacts the PVC slurry transferring on the perforated trays as the vapor penetrates fine perforations of the perforated trays.

The ejection rate of steam is preferably from 1 to 100 kg/h, and more preferably from 5 to 50 kg/h per $m^3$ of PVC slurry.

Ejection rates less than 1 kg/h allow PVC particles in a PVC slurry to precipitate, resulting in a poor efficiency in removing residual monomers in the PVC slurry. On the other hand, ejection rates in excess of 100 kg/h cause considerable splashing of PVC slurry, resulting in flooding in some cases. In addition, the efficiency of removing residual monomers from a PVC slurry is no more improved in view of the significant amount of steam introduced.

If the temperature of a PVC slurry is high, the efficiency of removing residual monomers is enhanced. However, excessively high temperatures give colors to PVC particles or degrade the particles, resulting in poor qualities of the final products. Therefore, controlling the temperature of a PVC slurry is directly related to obtaining PVC products of high quality. Generally speaking, the slurry temperature varies depending on the temperature of the steam ejected from the bottom of the tower. Preferably, the temperature and the ejection rate of steam are controlled so that the temperature of the PVC slurry which flows on the uppermost perforated tray 1 falls in a range from 50 to 150° C., preferably from 70 to 120° C., and more preferably from 80 to 110° C.

The pressure in the tower 12 for removing residual monomers is preferably maintained at a level from 0.2 to 3 $kg/cm^2$.

The tower 12 according to the present invention is provided with at least one hot water-ejecting device 5 inside the tower.

The hot water-ejecting device 5 is preferably provided at a position directly below the perforated trays. The hot water-ejecting device ejects hot water at predetermined intervals from a jet nozzle and cleans the tower 12 for removing residual monomers.

The hot water-ejecting device 5 is formed by winding a pipe so as to obtain a predetermined shape, and it is placed in the tower 12. Hot water is ejected against the lower face of perforated trays and inner circumferential walls of the tower to clean the tower. There are no limitations as to the number and position of ejecting nozzles of hot water. Hot water is preferably ejected so that the angle between the direction of the ejection and a vertical line is 10 to 60° rather than being ejected vertically upward from the nozzle.

The shape of hot water-ejecting device 5 is generally like Greek letters omega ($\Omega$) or phi ($\Phi$), spiral, starlike, or hair-pin like. Multiple layered rings in which rings are layered so that the center position of every other layer falls in the same point may also be used. The hot water-ejecting device 5 is provided in parallel to the perforated trays and it may be placed anywhere as long as it is housed in the tower 12. However, if the device 5 is too close to the inner circumferential walls, PVC particles and other materials may block clearances. Therefore, it is recommended that the hot water-ejecting device 5 be placed so that the outer surface of the device 5 is 20 mm or more apart in a radially inward direction from the surface of the inner walls of the tower, The outer diameter of hot water-ejecting device 5 according to the present invention is preferably from 150 to 8,000 mm in view of the size of the tower 12.

The shape of the ejecting nozzle provided in the hot water-ejecting device 5 may be circular, oval, slit-like, etc. The shape is selected depending on the purpose of use. If a circular or oval shape is employed the diameter or the major axis is generally preferably from 1 to 8 mm, whereas if a slit-like shape is employed, the length of the slit is generally preferably from 1 to 8 mm.

The PVC slurry passes through the predetermined passages on perforated tray 1 and demonomerized, and then flows down to perforated tray 1a through flow-down sections 4 and further demonomerized. The PVC slurry flows down to perforated trays 1b and 1c one after another and treated in the same manner as the above. Thereafter, the treated slurry is discharged from a discharging port 10. The discharged PVC slurry is pumped up by a pump 18 into a heat exchanger 16, where it is cooled. The cooled slurry is stored in PVC slurry tank 15. The PVC slurry from which residual monomers are fully removed is temporarily stored in the tank 15, after which it is transferred to a drying apparatus. The PVC slurry from which residual monomers were not sufficiently removed is charged into a slurry tank 13, and a demonomerizing operation is repeated.

EXAMPLES

The present invention will next be described by way of examples and comparative examples which should not be construed as limiting the invention. In the following Examples and Comparative Examples, evaluation was made as follows.

(1) Concentration of residual monomers:

A PVC slurry which had undergone a treatment of removing residual monomers was sampled from PVC slurry discharging port 10. The samples were dissolved in tetrahydrofuran. The concentration of residual monomers was measured by gas chromatography (Gas Chromatograph 8A, trademark, by Shimadzu Seisakusho K. K.). The measurement conditions were as follows.

Detecting section: FID type, hydrogen flame ionization detector.

Column: made of stainless steel (3 mm D×3 mm) Column filler: Ucon oil LB-550X 20%, Chromosolb W/AW 80-lOOMe Column temperature: 70° C. Temperature of gas chamber: 70° C. Carrier gas: nitrogen gas Director gas: air (2) Foreign matter:

A PVC slurry which had undergone treatment for removing residual monomers was sampled from PVC slurry discharging port 10 and dried to prepare 100 g of a PVC resin. The resin sample was spread on a white Kent paper and mixed well with a spatula. Foreign matter (colored PVC resin) in the PVC resin sample was visually checked, and the number of foreign matter pieces was counted.

(3) Bubbling conditions on perforated tray 1:

Bubbling conditions of a PVC slurry which flows on the uppermost plate 1 were checked and evaluated as follows:

A: Bubbles stay at low positions of the partition walls, and the fluidity of the PVC slurry is good.

B: Bubbles sometimes overflow beyond the partition walls.

C: Bubbles reach the vent 9, allowing PVC particles included in bubbles to enter condenser 14.

Example 1

Figure 3:
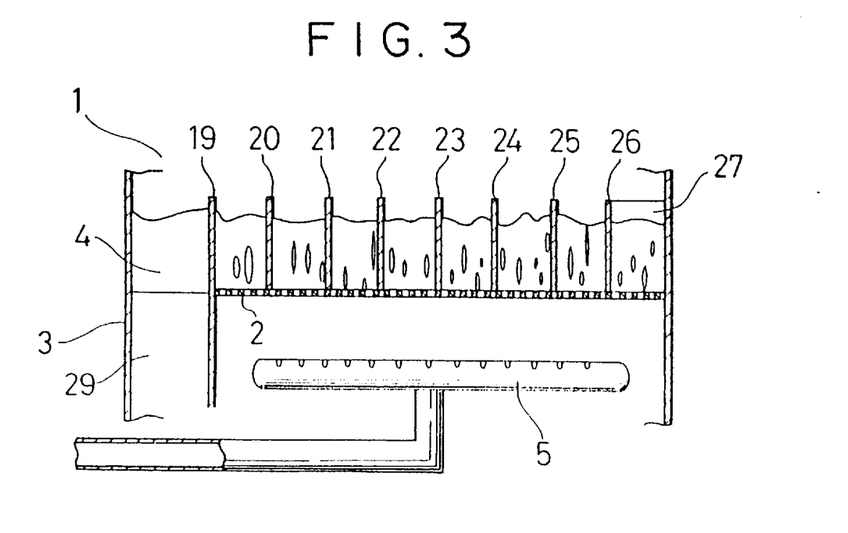
FIG. 3 is a cross-sectional view in the direction indicated by the arrows from line III—III in FIG. 2.

A demonomerizing treatment was carried out using a tower 12 for removing residual monomers. The tower 12 had a general shape of combined two columns with different inner diameters. The inner diameters of the upper and lower sections were 2,000 mm and 1,300 mm, respectively. The tower had an inner height of 7,400 mm. In the upper section of the tower, more precisely, at the position of 5,800 mm upward from the bottom of the tower, a perforated tray 1 was horizontally placed. The perforated tray 1 had a perforated baseplate 2 containing small through-holes having a diameter of 1.3 mm (hole area: 0.3%). On the perforated baseplate 2, partition walls 19 to 28 having a wall height of 290 mm were vertically set so that passages having a width of 200 mm were provided. The perforated tray 1 had a diameter of 2,000 mm. In the lower section of the tower, perforated trays 1a to 1c each having a diameter of 1,300 mm were horizontally placed at an interval of 1,600 mm. The perforated trays 1a to 1c each had a perforated baseplate containing small through-holes having a diameter of 1.3 mm (hole area: 0.3%). On each perforated baseplate, partition walls having a wall height of 500 mm were vertically set so that passages having a width of 200 mm were provided. In this tower 12, the point of variation in the inner diameter was at an intermediate point between the locations of perforated tray 1 and perforated tray 1a. The variation point was in fact at about 4,600 to 5,400 mm upward from the inside bottom of the tower.

The PVC slurry which was demonomerized in this tower was a straight PVC having an average polymerization degree of 1,300 (polymerization conversion factor: 82%). The PVC slurry concentration was 30% by weight, and the concentration of residual monomers in PVC particles was 30,000 ppm on the weight basis of PVC.

A PVC slurry which had undergone a polymerization reaction was immediately transferred to a slurry tank 13. From the tank 13r the PVC slurry was pumped up by a pump 17 (20 m³/h ) to a heat exchanger 16, where it was preheated at 80° C. Thereafter, the preheated slurry was transferred to the tower 12 for removing residual monomers via PVC slurry introducing port 6.

The PVC slurry passed through the passages on perforated tray 1, during which the slurry was demonomerized due to contact with steam ejected through the small through-holes of perforated tray 1.

The vapor was a superheated vapor of 110° C. The steam was introduced from a steam introducing port 11 provided in the bottom of the tower 12 at a rate of 600 kg/h. The PVC slurry passing through on perforated tray 1 was heated at 10° C. by the steam.

Figure 4:
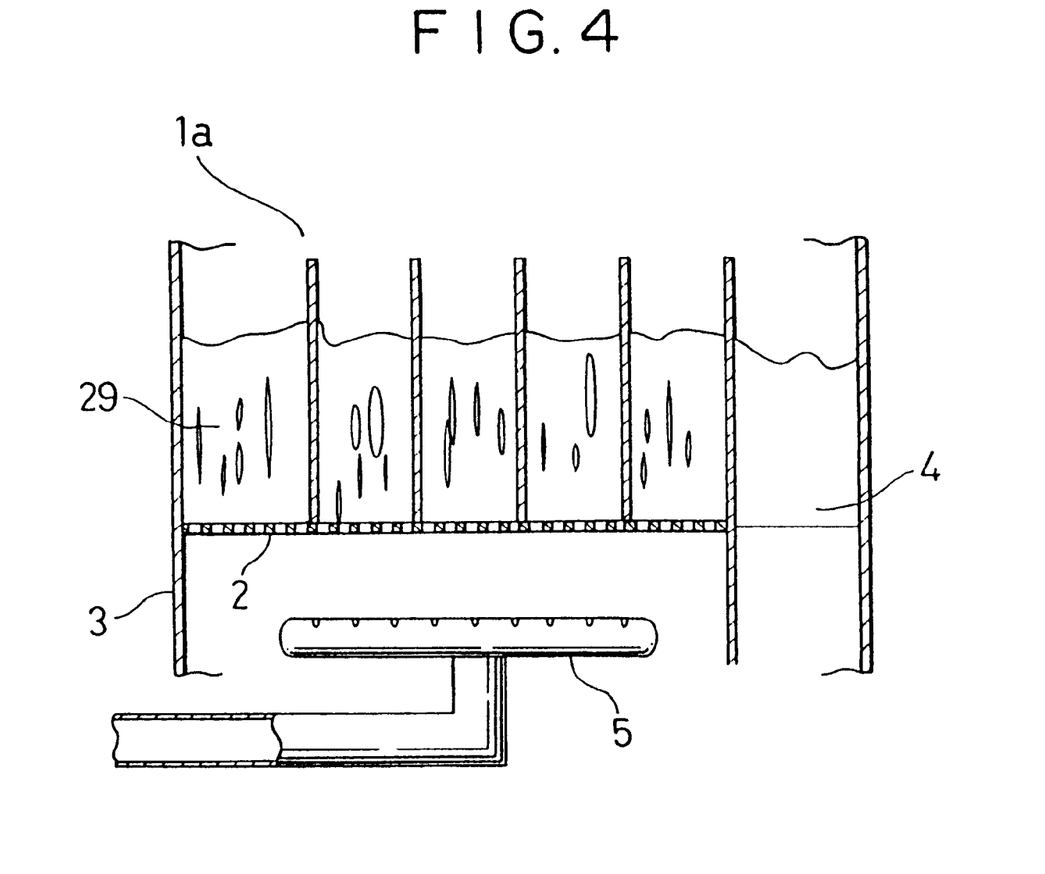
FIG. 4 is a schematic elevation view of a perforated tray 1a (the second plate counted from the top).

Subsequently, the PVC slurry flowed through the passages and flow-down sections 4 formed between section plates 2729 and an inner wall of the tower 12, provided on perforated trays 1a, 1b, and 1c, during which the slurry was demonomerized by steam. The treatment time for the PVC slurry, that is, the time required for the PVC slurry introduced through the PVC slurry introducing port 6 to be discharged from the PVC slurry discharging port 10 was 10 minutes.

In the tower 12, directly under each of the perforated trays 1a, 1b, and 1c, three ring-type hot water-ejecting devices 5 were provided. Each device 5 had a diameter of 800 mm, and was equipped with a round nozzle hole having a pipe diameter of 50A. The hot water-ejecting device 5 ejected hot water against the overhead perforated tray and the inner walls of tower 12 at intervals of 10 minutes for 5 seconds each time (0.5 m³/h) to clean the inside of the tower.

The PVC slurry which had undergone a demonomerizing treatment was discharged from PVC slurry discharging port 10 directly connected to the end of the passages on perforated tray 1c. Thereafter, the treated slurry was forwarded to heat exchanger 16 by a pump 18. In the heat exchanger 16, the slurry was cooled to 50° C. Then it was stored in a PVC slurry tank 15. The concentration of the PVC residual monomers in the PVC slurry which had undergone the demonomerizing treatment was not higher than 1 ppm. No foreign matter was found in the PVC present in the PVC slurry. The results are shown in Table 1.

A steam mixture of VC and the water generated from the top chamber 7 of the tower 12 was discharged from a vent 9, condensed in a condenser 14. As a result, water and residual monomers were separately recovered. In the condenser 14, no PVC particles were detected.

Example 2

A PVC slurry was demonomerized using a tower and conditions described in Example 1, except that the upper section of the tower was such that a perforated tray 1 having a diameter of 1,600 mm was provided, partition walls 24 and 25 were eliminated, and the partition walls had a wall height of 350 mm. The concentration of residual monomers in the PVC in the slurry which had undergone the demonomerizing treatment was not higher than 1 ppm. In addition, no foreign matter was found in the PVC in the slurry. The results are shown in Table 1. In condenser 14, no PVC particles were detected.

Example 3

A PVC slurry was demonomerized using a tower and conditions described in Example 1, except that the upper section of the tower was such that a perforated tray 1 having a diameter of 1,400 mm was provided, partition walls 23 to 25 were eliminated with the remainder partition walls being rearranged to form zig-zag passages, and the wall height was 500 mm. The concentration of PVC residual monomers in the PVC in the slurry which had undergone the demonomerizing treatment was 13 ppm. No foreign matter was found in the PVC in the slurry. The results are shown in Table 1.

In condenser 14, a trace amount of PVC particles was detected.

Comparative Example 1

A PVC slurry was demonomerized using a tower and conditions described in Example 1, except that the diameter of perforated tray 1 was 1,300 mm, partition walls 23 to 25 were eliminated with the remainder partition walls being rearranged to form zig-zag passages, and the wall height was 500 mm. The concentration of residual monomers in the PVC in the slurry which had undergone the demonomerizing treatment was 350 ppm. No foreign matter was found in the PVC present in the slurry. The results are shown in Table 1.

The PVC slurry flowing through the passages on the uppermost plate bubbled vigorously, and PVC particles, being carried by bubbles, entered the condenser through the vent. Eventually, the particles clogged condenser 14, and thus, operation could no more continued when 25 minutes has passed after the operation started.

Comparative Example 2

A PVC slurry was demonomerized using a tower and conditions described in Example 1, except that the hot water from hot water-ejecting device 5 was not ejected. The concentration of residual monomers in the PVC in the slurry which had undergone the demonomerizing treatment was not more than 1 ppm. 139 pieces of foreign matter was found in the PVC present in the slurry. The results are shown in Table 1.

Comparative Example 3

A PVC slurry was demonomerized using a tower and conditions described in Example 1, except that the diameter of perforated tray 1 was 1,300 mm, partition walls 23 to 25 were eliminated with the remainder partition walls being rearranged to form zig-zag passages, and the wall height was 500 mm, and in addition, the PVC slurry was introduced into the tower at a rate of 9 m³/h by pump 17. The concentration of residual monomers in the PVC in the slurry which had undergone the demonomerizing treatment was 2 ppm. No foreign matter was found in the PVC present in the slurry. The results are shown in Table 1.

TABLE 1

|  | Examples | | | Comparative Examples | | |
|---|---|---|---|---|---|---|
|  | 1 | 2 | 3 | 1 | 2 | 3 |
| Conditions of Operation: | | | | | | |
| Inner diameter of the upper section of the tower (mm) | 2000 | 1600 | 1400 | 1300 | 2000 | 1300 |
| Inner diameter of the lower section of the tower (mm) | 1300 | 1300 | 1300 | 1300 | 1300 | 1300 |
| Flow rate of treatment (m³/h) | 20 | 20 | 20 | 20 | 26 | 9 |
| Hot water ejecting device | Yes | Yes | Yes | Yes | No | Yes |
| Test Results: | | | | | | |
| Smoothness of operation | Good | Good | Good | Not good* | Good | Good |
| Concentration of residual monomers (ppm) | ≦1 | ≦1 | 13 | 350 | ≦1 | 2 |
| Foreign matter (pieces) | 0 | 0 | 0 | 0 | 139 | 0 |
| Bubbling conditions at the perforated plate 1 | A | A | B | C | A | A |

*The operation could not be continued when 25 minutes has elapsed from the start of the operation.

As is apparent from Table 1, the tower for removing residual monomers according to the present invention achieved the following effects.

1. Since bubbling is controlled in the uppermost perforated tray, where bubbling of a PVC slurry is the most significant, PVC slurry does not overflow beyond partition walls, and therefore, PVC particles do not migrate into the condenser through the vent. As a result, PVC particles are not accumulated in the condenser.

2. Residual monomers can be removed from a PVC slurry to a great degree (not more than 1 ppm).

3. Inclusion of foreign matter is inhibited because hot water ejected from a hot water-ejecting device cleans the inside walls of the tower.

4. An effective demonomerizing treatment can be performed. Specifically, an increased amount of a PVC slurry can be demonomerized by a smooth operation to yield PVC particles of high quality.

What we claim is:

1. A tower for removing residual monomers from a slurry of vinyl chloride resin which has undergone a polymerization reaction which comprises the following structural features:

1) the tower has at least upper and lower sections of a generally cylindrical shape with different inner diameters,
2) the uppermost section of the tower has a port for introducing a slurry of vinyl chloride resin into the tower,
3) the inner diameter of the uppermost section of the tower is greater than that of the lower section of the tower,
4) at least one perforated tray is provided at the upper section of the tower,
5) at least one perforated tray is provided at the lower section of the tower,
6) a flow-down section for flowing down the vinyl chloride resin slurry to the lower perforated tray is provided between the perforated trays,
7) a means for ejecting steam in an upward direction in the tower is provided at the bottom of the tower,
8) a port for discharging the treated vinyl chloride resin slurry is provided at the lowermost section of the tower,
9) at least one hot water-ejecting device is located proximate at least one of said perforated tray in the tower.

2. The tower according to claim 1, wherein the inner diameter of the uppermost section of the tower is from 1.20 to 5 times that of the inner diameter of the lowermost section of the tower.

3. A tower for removing residual monomers from a slurry of vinyl chloride resin which has undertone a polymerization reaction which comprises the following structural features:

1) the tower has at least upper and lower sections of a generally cylindrical shape with different inner diameters;

2) the uppermost section of the tower has a port for introducing a slurry of vinyl chloride resin into the tower;
3) the inner diameter of the upper section of the tower is greater than that of the lower section of the tower;
4) at least one perforated tray which has a perforated baseplate having a plurality of partition walls provided vertically on the upper surface of the baseplate, is provided at the upper section of the tower;
5) at least one perforated tray which has a perforated baseplate having a plurality of partition walls provided vertically on the upper surface of the baseplate, is provided at the lower section of the tower;
6) the height of the partition walls on the baseplate at the uppermost section of the tower is lower than that on the baseplate at the lower section of the tower;
7) a flow-down section for flowing down the slurry to the lower perforated tray is provided between the perforated trays;
8) a means for ejecting steam in an upward direction in the tower is provided at the bottom of the tower;
9) a port for discharging the treated vinyl chloride resin slurry is provided at the lowermost section of the tower; and
10) at least one hot water-ejecting device is located proximate at least one of said perforated tray in the tower.

4. The tower according to claim 3, wherein the inner diameter of the upper section of the tower is from 1.20 to 5 times that of the lower section of the tower.

5. A tower for removing residual monomers according to claim 3, wherein the height of the inside of the tower is in the range of 2 to 20 times the inner diameter of the lower section of the tower.

* * * * *